US007257160B2

(12) United States Patent
Ju et al.

(10) Patent No.: US 7,257,160 B2
(45) Date of Patent: Aug. 14, 2007

(54) METHOD AND APPARATUS OF PICTURE DISPLAY

(75) Inventors: Chi-Cheng Ju, Taipei (TW); Tzu-Ping Lin, Pingtung (TW)

(73) Assignee: Mediatek Inc., Hsin-Chu (TW)

( * ) Notice: Subject to any disclaimer, the term of this patent is extended or adjusted under 35 U.S.C. 154(b) by 932 days.

(21) Appl. No.: 10/346,063

(22) Filed: Jan. 17, 2003

(65) Prior Publication Data

US 2003/0133508 A1 Jul. 17, 2003

(30) Foreign Application Priority Data

Jan. 17, 2002 (TW) .............................. 91100700 A

(51) Int. Cl.
*H04N 7/12* (2006.01)
*H04N 11/02* (2006.01)

(52) U.S. Cl. .......................... 375/240.12; 375/240.25; 348/578

(58) Field of Classification Search ........... 375/240.12, 375/240.25, 240.16; 348/578; 386/109
See application file for complete search history.

(56) References Cited

U.S. PATENT DOCUMENTS

| | | | | |
|---|---|---|---|---|
| 5,668,599 | A | 9/1997 | Cheney et al. | |
| 5,943,096 | A * | 8/1999 | Choo | 375/240.16 |
| 5,959,690 | A * | 9/1999 | Toebes et al. | 348/578 |
| 6,192,079 | B1 * | 2/2001 | Sharma et al. | 375/240.16 |
| 6,339,669 | B1 | 1/2002 | Taniguchi | |
| 6,490,324 | B1 | 12/2002 | McDade et al. | |
| 2001/0009567 | A1 | 7/2001 | Tsuboi | |
| 2002/0061065 | A1 | 5/2002 | Moore | |
| 2002/0114395 | A1 | 8/2002 | Owen et al. | |
| 2003/0058941 | A1 | 3/2003 | Chen et al. | |

OTHER PUBLICATIONS

Jui-Hua Li, et al., "Architecture and Bus-Arbitration Schemes for MPEG-2 Video Decoder," IEEE Tansactions on Circuits and Systems for Video Technology, vol. 9, No. 5, Aug. 1999, pp. 727-736.

* cited by examiner

*Primary Examiner*—Gims Philippe
*Assistant Examiner*—Erick Rekstad
(74) *Attorney, Agent, or Firm*—Rabin & Berdo, PC

(57) ABSTRACT

A method and an apparatus of picture display. The invention displays the first picture and the second picture and displaying at least one virtual picture in between the first and the second picture. The motion compensator is included in a DVD player. The method includes: decoding the first and the second pictures from the received bit-stream; creating the virtual picture parameter according to the transition effect; and generating the virtual picture according to the virtual picture parameter by the motion compensator.

21 Claims, 6 Drawing Sheets

METHOD AND APPARATUS OF PICTURE DISPLAY

This application claims the benefit of Taiwan application Serial No. 091100700, filed Jan. 17, 2002.

BACKGROUND OF THE INVENTION

1. Field of the Invention

The present invention relates in general to the method and apparatus of displaying pictures with transition effects, and more particularly to the method and apparatus of displaying pictures with transition effects utilizing a motion compensator.

2. Description of the Related Art

With rapid advance in the development of multimedia applications, various types of audio and video products are created to satisfy the demands of consumers. Taking the DVD audio specification as an example, it has higher sampling rate and better audio quality than the traditional CD audio specification.

The DVD audio specification requires that the DVD audio player not only plays back DVD audio tracks but also has the ability to display pictures stored in the DVD audio disk. It also requires that the pictures must be displayed with the transition effects. For example, wipe or dissolve effect, are used between displaying different pictures. Traditionally, those transition effects can be accomplished by firmware executed by a general-purpose central processing unit (CPU) or by other additional dedicated hardware. However, the workload on the CPU is usually very high and the additional computation power for the transition effects will overload the CPU. On the other hand, the additional dedicated hardware also increases the cost of the system.

SUMMARY OF THE INVENTION

It is therefore an object of the present invention to provide an improved and simplified process of applying transition effects when displaying pictures by using the motion compensator in the DVD players.

The pictures stored in the DVD audio disk are encoded as MPEG Intra-Pictures (I-picture). Therefore, during the decoding of these still pictures, the motion compensator in the DVD player is idle. It is an object of the present invention to apply transition effects for displaying pictures by the idle motion compensator with the virtual picture function without the need of any excessive CPU loading or any additional dedicated hardware. Hence, the cost of the hardware can be substantially reduced and the hardware utilization of motion compensator is increased as well.

According to the object of the present invention, a method of applying transition effects between displaying pictures is provided; it is used to display the first picture and the second picture, in between which at least one virtual picture is inserted. The motion compensator is included in a DVD player. The method of the present invention includes generating virtual picture parameters according to the requirements for the transition effect and generating a virtual picture according to these virtual picture parameters.

It is another object of the present invention to provide an apparatus for picture playback. The apparatus displays the first picture and the second picture, in between which at least one virtual picture is inserted according to the requirements for the transition effect. The apparatus includes a memory, a video decoding system, and a display control system. The displaying data of the first and the second pictures are stored in the memory. The video decoding system generates virtual pictures according to the requirements for the transition effect by using the motion compensator. The display control system displays the first picture, virtual pictures, and the second picture.

Other objects, features, and advantages of the present invention will become apparent from the following detailed description of the preferred but non-limiting embodiments. The following description is made with reference to the accompanying drawings.

DETAILED DESCRIPTION OF THE INVENTION

The bit-stream of the MPEG (Moving Picture Coding Experts Group) video includes a series of I pictures (Intra-coded pictures), P pictures (forward Predictive pictures), and B pictures (Bi-directionally predictive-coded pictures). I pictures are encoded as stand-alone still image. P pictures are encoded referring to the nearest I or P pictures by forward prediction processing. B pictures are encoded referring to the nearest past and future I and P pictures by bi-directional prediction. After the referenced I or P pictures are decoded, the B-picture can be decoded. The B-picture has the highest compression rate. A picture is composed of multiple blocks, and a block is the basic unit for encoding and decoding a picture.

Figure 1:
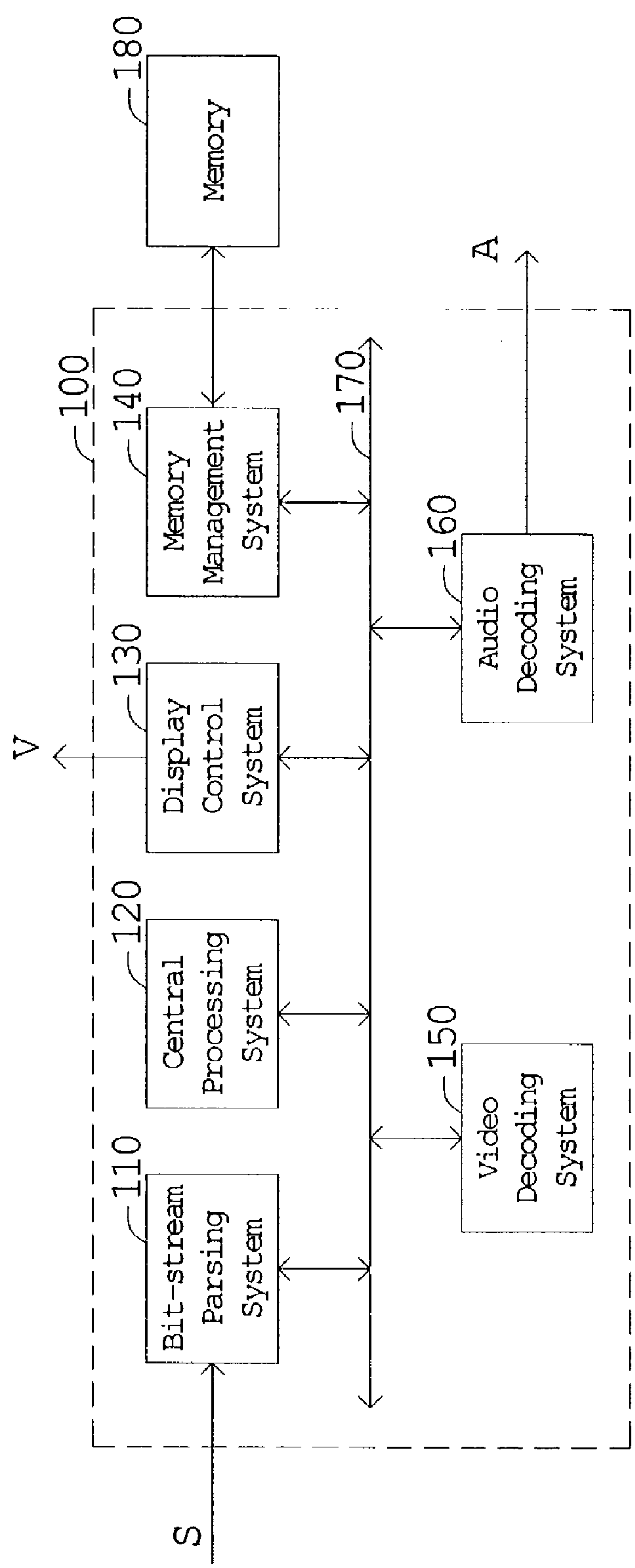
FIG. 1 illustrates the block diagram of a conventional DVD player.
Figure 2:
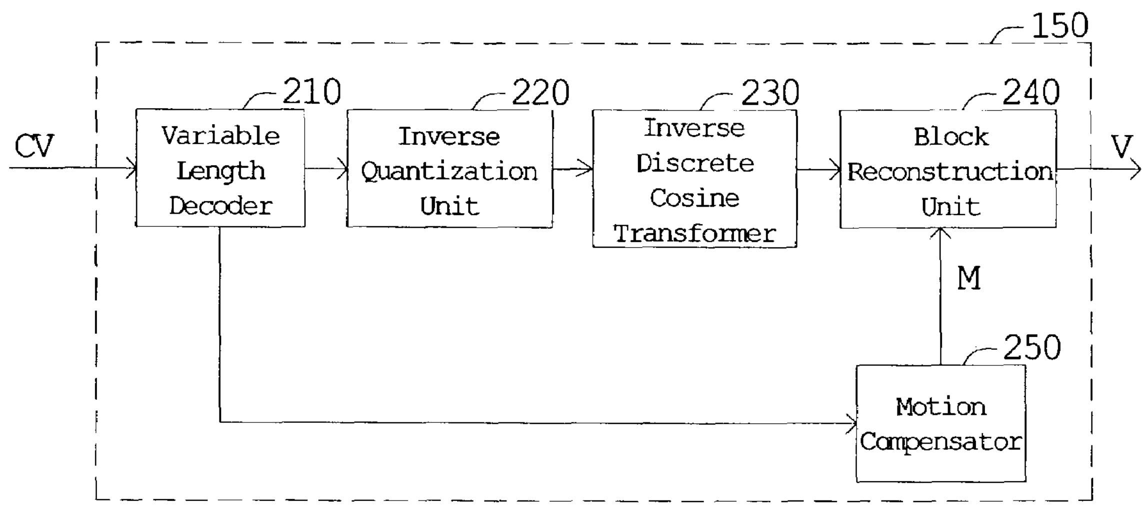
FIG. 2 illustrates the block diagram of the Video Decoding System 150.

FIG. 1 shows the block diagram of a conventional DVD player 100. The DVD player 100 is used to decode the incoming bit-stream S into audio A and video V outputs. The Bit-stream Parsing System 110 receives the MPEG bit-stream S and parses the MPEG bit-stream S into two coded bit-streams: coded audio bit-stream Ca and coded video bit-stream Cv; these two coded bit-streams are then stored into the Memory 180 via the Memory Management System 140. Then the bit-stream Ca and Cv are accessed and decoded into audio A and video V, respectively, by the Audio Decoding System 160, and the Video Decoding System 150; the decoded audio A and the decoded video V are again stored into the Memory 180 via the Memory Management System 140. The Display Control System 130 fetches the decoded video V from the Memory 180, and outputs it along with the decoded audio A, for example, to a television set. The Central Processing System 120 is used to control and coordinate data flow among the systems, and data is transmitted among the systems through the Transmission Bus 170. FIG. 2 illustrates the block diagram of the Video Decoding System 150. The Video Decoding System includes a Variable Length Decoder (VLD) 210, an Inverse Quantization Unit (IQ) 220, an Inverse Discrete Cosine Transformer (IDCT) 230, a Block Reconstruction Unit (BR) 240, and a Motion Compensator 250. The VLD 210 receives the video bit-stream Cv and accordingly outputs the first decoded parameters to the IQ 220 and the IDCT 230 for the inverse quantization and inverse discrete cosine transformation operations, and the results after the transformation are then output to the BR 240. The VLD 210 also outputs the second decoded parameters to the Motion Compensator 250, so that the Motion Compensator 250 can retrieve prediction blocks from the reference pictures stored in the Memory 180 and then perform motion-compensation operation. The motion-compensated block M is sent to the BR 240. The BR 240 combines both the IDCT result and the motion-compensated block to create a reconstructed block of the decoded picture and write back the result to Memory 180 as the decoded video V.

Figure 3:
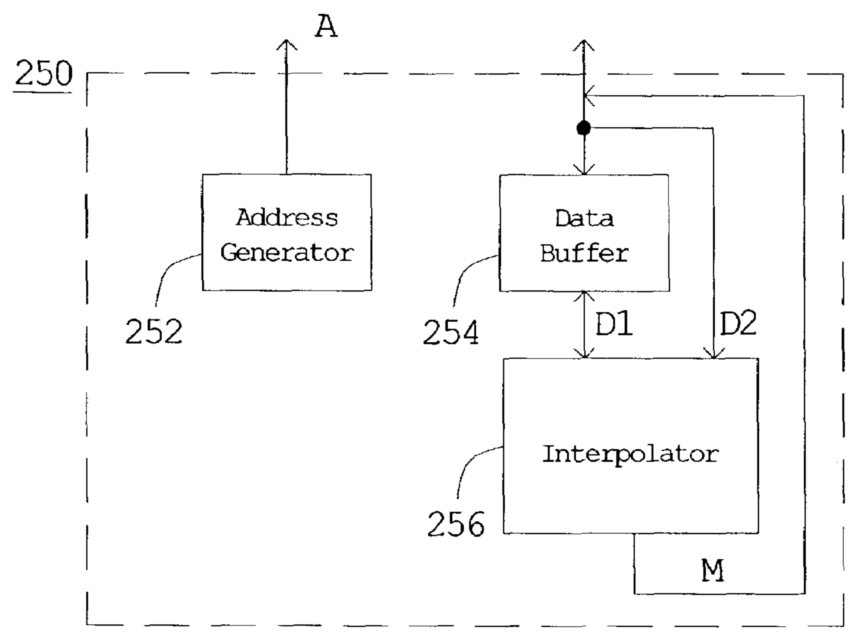
FIG. 3 illustrates the block diagram of the Motion Compensator.

A traditional Motion Compensator 250 retrieves a block from the Memory 180 according to the second decoded parameters that mainly includes motion type (MT) and motion vector (MV). The size and type of block retrieved by the Motion Compensator is determined by the MT, whereas the actual memory address of the data is determined by the MV. The Motion Compensator offers the functionality of forward motion compensation and bi-directional motion compensation during the decoding of P-pictures and B-pictures, respectively. FIG. 3 illustrates the block diagram of the Motion Compensator 250. The Motion Compensator 250 includes an Address Generator 252, a Data Buffer 254, and an Interpolator 256. The Address Generator 252 generates the address A according to the MV of the second decoded parameters. Data Buffer 254 receives the data D indicated by address A. If the Motion Compensator is performing forward motion compensation, then the motion-compensated block M is outputted according to data D. Whereas, if the Motion Compensator is performing bi-directional motion compensation, a block D1 is retrieved from the previous reference picture Fp and stored in the Data Buffer 254 first; another block D2 is retrieved from the subsequent reference picture Ff, and then D1 and D2 are interpolated by the Interpolator 256, and the generated motion-compensated block M is outputted.

In order to create transition effects by using the existing Motion Compensator when displaying pictures stored in the disk. The present invention equipped the Motion Compensator with a new function called "virtual picture function". Such function makes the Motion Compensator capable of accessing data among the memory buffers, and performs like a direct memory access (DMA) channel. A traditional Motion Compensator as described above can only receive the decoded parameters decoded from a real encoded MPEG bit-stream by a Variable Length Decoder and can only retrieve blocks from previous or subsequent reference pictures in order to generate the motion-compensated block M in a real picture.

The preferred embodiment according to the present invention provides a Parameter Generating Unit capable of generating virtual picture parameters to the Motion Compensator. The virtual picture parameters are generated based on desired transition effects so as to indicate the Motion Compensator to move data among the memory buffers. The virtual picture parameters generated by the Parameter Generating Unit are not obtained from decoding a real MPEG bit-stream by a variable length decoder. On the contrary, the Parameter Generating Unit can generate all necessary parameters in a virtual picture by itself. The Motion Compensator receives these virtual picture parameters from the Parameter Generating Unit and decodes "virtual" pictures created according to the invention. The virtual picture can be further categorized as a P-virtual picture or a B-virtual picture. The P-virtual picture is similar to an ordinary P-picture, and can be generated by transferring data from one memory buffer to another memory buffer. The B-virtual picture is similar to an ordinary B-picture, and can be generated by transferring data from two memory buffers and output processed data to a memory buffer. The P-virtual picture and B-virtual picture are similar to ordinary P-picture and B-picture except that the P-virtual picture and B-virtual picture are created instead of being decoded from the real MPEG video bit stream.

Figure 4:
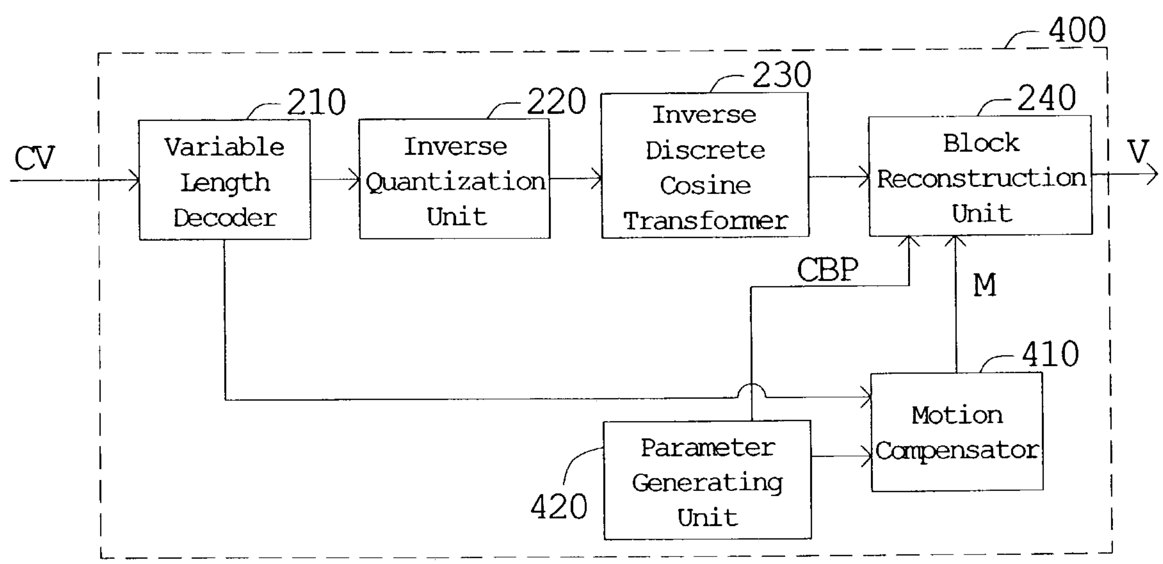
FIG. 4 illustrates the block diagram of the Video Decoding System of a preferred embodiment according to the invention.

FIG. 4 illustrates the block diagram of the Video Decoding System 400 of a preferred embodiment according to the invention. The Video Decoding System 400 includes a Motion Compensator 410, a Parameter Generating Unit 420, a Variable Length Decoder (VLD) 210, an Inverse Quantization Unit (IQ) 220, an Inverse Discrete Cosine Transformer (IDCT) 230, and a Block Reconstruction Unit (BR) 240. The Parameter Generating Unit 420 generates the virtual picture parameters and coded block pattern parameter (CBP) according to the requirements of the desired transition effect. The virtual picture parameters mainly include a motion type (MT) and a motion vector (MV). In order to generate a block of a virtual picture, the Motion Compensator 410 fetches data from memory buffers and outputs the motion-compensated block M to the BR 240 according to the virtual picture parameters provided from the Parameter Generating Unit 420. At the same time, the Parameter Generating Unit 420 sets the CBP parameter to zero, and outputs the CBP parameter (which equals zero) to the BR 240 as well. The CBP parameter (which equals zero) makes the BR 240 ignore the output of the IDCT 230, so the output of the BR 240 is generated only by the input motion-compensated block M from the Motion Compensator 410.

Figure 5A:
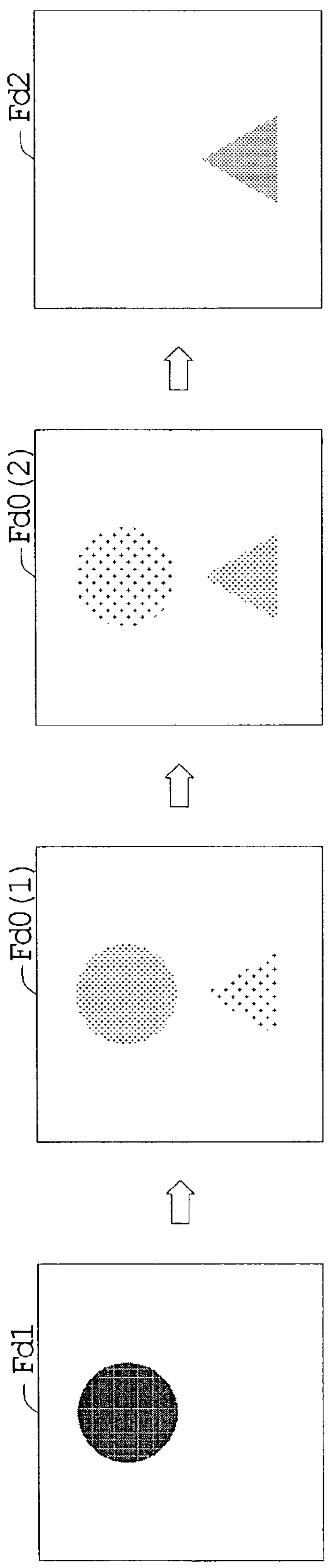
FIGS. 5A and 5B illustrate the sketches of the application of the dissolve effect on displaying pictures.
Figure 5B:
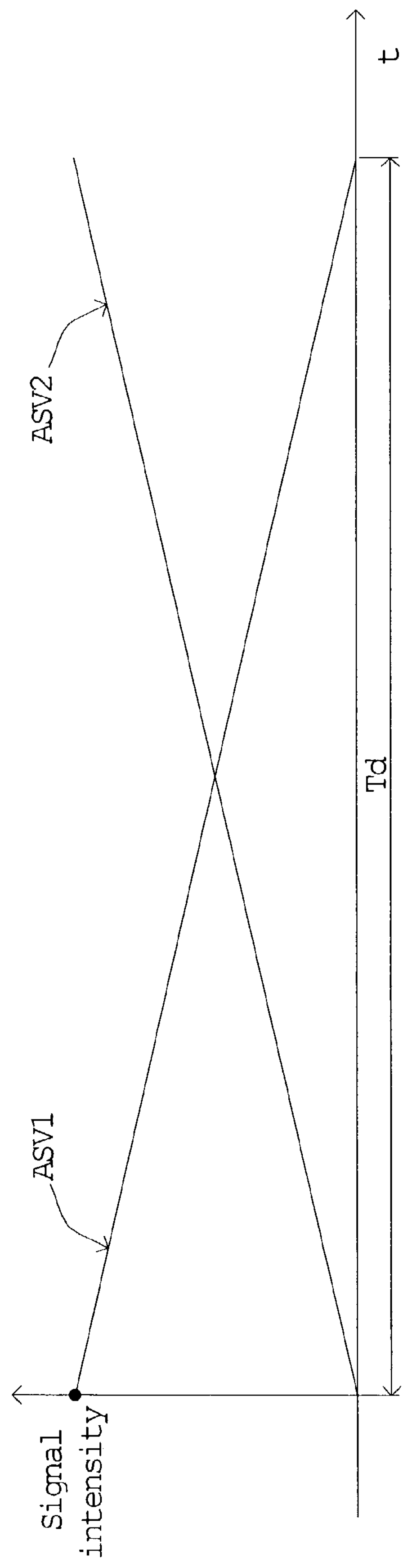

Three exemplary transition effects are demonstrated below, they are respectively 'dissolve,' 'wipe,' and 'move-in.' FIGS. 5A and 5B illustrate the sketches of the application of the dissolve effect between displaying pictures. Picture Fd1 and Fd2 are the two pictures to be displayed; Fd1 is displayed first, and then Fd2 is displayed with the dissolve transition effect. Picture Fd0(1) and Fd0(2) are virtual pictures created in this embodiment. In picture Fd0 (1), the signal intensity ASV1 of the picture Fd1 decreases, ASV2 of picture Fd2 increases; in picture Fd0(2), ASV1 of Fd1 picture further decreases whereas ASV2 of picture Fd2 further increases. If the signal intensity of a picture increases, the picture becomes clearer, and if the signal intensity decreases, the picture becomes vague. After the dissolve period Td, the signal intensity ASV1 reaches zero and the resulting display picture is exactly the picture Fd2. The method to implement the dissolve effect will be discussed later.

Figure 6:
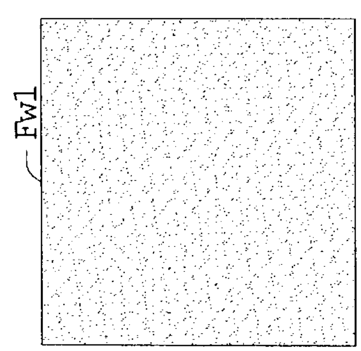
FIG. 6 illustrates the sketch of the application of the wipe effect on displaying pictures.
Figure 6:
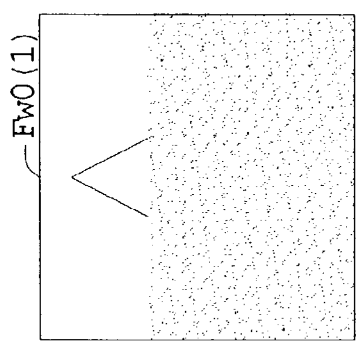
Figure 6:
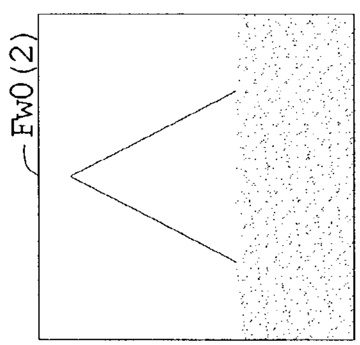
Figure 6:
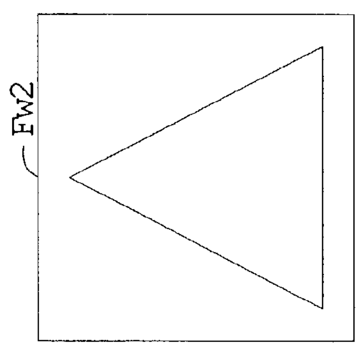

FIG. 6 illustrates the sketch of the application of the wipe effect between displaying pictures. The wipe effect can be performed downwards, upwards, rightwards, or leftwards. Wipe effect performed downwards is discussed as an example here. The picture Fw1 is displayed initially, and the picture Fw2 is gradually displayed from the upward till the whole picture Fw2 is displayed. Fw0(1) and Fw0(2) are virtual pictures created according to the preferred embodiment. In Fw0(1), the upper section of Fw2 has appeared; in Fw0(2), the upper and middle section of Fw2 has appeared; next, the complete picture Fw2 is displayed. The following describes the method of picture display using the wipe effect in this embodiment. The Motion Compensator 410 utilizes P-virtual picture to achieve the wipe effect. In the first step, the virtual picture parameters, which mainly include the motion type (MT), the motion vector (MV), and the coded block pattern (CBP), which is zeroed, are outputted by the Parameter Generating Unit 420. The Motion Compensator 410 can then determine the fetching block size, for example 16×16 pixels or 16×8 pixels, according to the MT; it then retrieves a block D1 from picture Fw2 according to the MV and generates a motion-compensated block M according to the D1. The BR 240 then creates a block of the virtual picture according to the zero CBP and the motion-compensated block M. Initially, the picture Fw1 is in the display buffer; the MV generated by the Parameter Generating Unit 420 directs the Motion Compensator 410 to transfer blocks of the picture Fw2 into the display buffer. In the virtual picture Fw0(1), the blocks in the top section of picture Fw2 is transferred into the display buffer. In the virtual picture Fw0(2), the blocks in the middle section of picture Fw2 is also transferred into the display buffer. In a final virtual picture, the blocks in the bottom section of picture Fw2 is transferred into the display buffer. The wipe effect is completed, and the picture stored in the display buffer is the picture Fw2.

Figure 7:
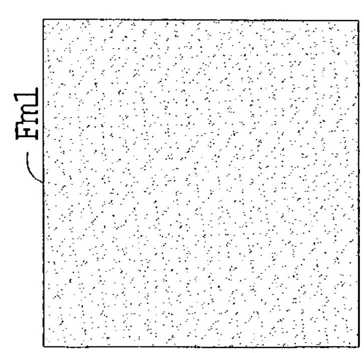
FIG. 7 illustrates the sketch of the application of the move-in effect on displaying pictures.
Figure 7:
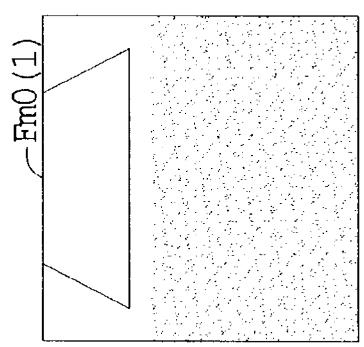
Figure 7:
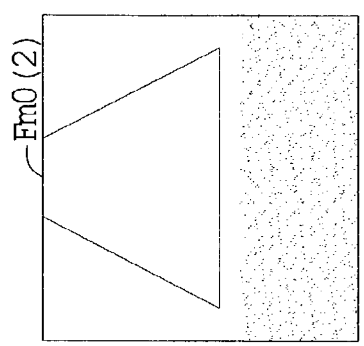
Figure 7:
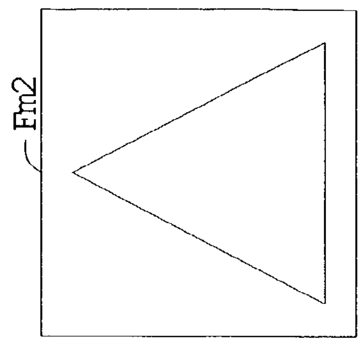

FIG. 7 illustrates the sketch of the application of the move-in effect between displaying pictures. The move-in effect can be performed downwards, upwards, rightwards, or leftwards. Move-in effect performed downwards is discussed as an example here. Initially, picture Fm1 is stored in the display buffer and is displayed. Then, picture Fm2 is moved in. Pictures Fm0(1) and Fm0(2) are virtual pictures created by the preferred embodiment. In picture Fm0(1), the bottom section of Fm2 has appeared in the top of display buffer; in picture Fm0(2), the bottom and middle sections of Fm2 have appeared; afterwards, the complete picture of Fm2 is displayed. The move-in effect utilizes the Motion Compensator 410 and its P-virtual picture function. The method of move-in effect is similar to the method described in the wipe effect above; only the source and destination addresses of block transfers are different. At the beginning, the blocks in the bottom section of picture Fm2 are transferred, and they are placed on the top section of the picture Fm1 in the display buffer. As time goes by, more blocks in the bottom section of picture Fm2 are transferred into the display buffer, and the move-in effect is completed when the blocks in the display buffer contain the entire picture of Fm2.

The implementation of the dissolve effect uses the B virtual picture function by the Motion Compensator 410. Please refer to FIG. 5A. Pictures Fd1 and Fd2 are interpolated to create virtual pictures. The dissolve effect is to gradually decrease the signal intensity ASV1 of picture Fd1 and to gradually increase the signal intensity ASV2 of picture Fd2 during the dissolve period Td. At the end of the dissolve period Td, picture Fd2 is the picture on the display. During the dissolve effect process, the Parameter Generating Unit 420 generates motion type MT, forward motion vector MV1, and backward motion vector MV2 for the Motion Compensator 410. The Parameter Generating Unit 420 also generates coded block pattern CBP, which is set to zero, for the BR 240. The Motion Compensator 410 retrieves a block D1 from the picture Fd1, and a block D2 from the picture Fd2 according to the MV1 and the MV2, respectively, and interpolates D1 and D2 to create motion-compensated block M. Then, the BR 240 receives CBP (which equals zero) and uses the motion-compensated block M to construct a block of virtual picture Fd0. When all the blocks of a virtual picture are constructed according to the method described above, the virtual picture can be displayed.

The interpolation process changes the signal intensity of pictures Fd1 and Fd2 according to the alpha values. The formula for displaying pictures by the dissolve effect is:

$$Fd0(t)=(1-\text{alpha}(t))*Fd1+\text{alpha}(t)*Fd2 \quad (1)$$

where Fd0(t) is the virtual picture displayed at time t.

Initially at time t=0, alpha(0)=0, and therefore Fd0(0)=Fd1. The alpha value alpha(t) increases with time. At the ends of the dissolve period Td, the alpha value alpha(Td) reaches 1, and therefore Fd0(Td)=Fd2, which means that Fd2 is completely displayed.

Due to the fact that the two operands of each multiplication operator in equation (1) are variable, two general-purpose multipliers hardware are required, but such arrangement increases the hardware cost. In order to reduce the cost, the variable alpha(t) can be simplified to a constant value alpha, for example alpha=⅓. Using such simplification, the expensive general-purpose multipliers can be replaced by constant multipliers, and equation (1) can be converted to the following recursive equation:

$$Fd0(t)=(1-\text{alpha})*Fd0(t-1)+\text{alpha}*Fd2 \quad (2)$$

wherein $t>0$. When $t=0$, $Fd0(0)=Fd1$.

In equation (1), three buffers are required to store picture Fd0, Fd1, and Fd2, whereas in equation (2) only two buffers are needed for storing Fd0 and Fd2. Virtual picture Fd(t−1) is the previous picture of virtual picture Fd0(t). Equation (2) can also accomplish the task of gradually decreasing the signal intensity ASV1 of Fd1 and increasing the signal intensity ASV2 of Fd2. For example:

$$t=0,\ Fd0(0)=Fd1$$

$$t=1,\ Fd0(1)=(2/3)*Fd1+(1/3)*Fd2$$

$$\begin{aligned} t=2,\ Fd0(2) &= (2/3)*Fd0(1)+(1/3)*Fd2 \\ &= (2/3)\{(2/3)*Fd1+(1/3)*Fd2\}+(1/3)*Fd2 \\ &= (4/9)*Fd1+(5/9)*Fd2 \end{aligned}$$

and so on.

The cost of hardware can be further reduced by setting the value of alpha in the $1/2^n$ format, where n is positive integer. In this way, a simple shifter can be used as a substitution for multipliers. By using the new alpha value, equation (3) is:

$$\begin{aligned} Fd0(t) &= Fd0(t-1)*(1-(1/2^n))+Fd2*(1/2^n) \quad (3) \\ &= (Fd0(t-1)*2^n-Fd0(t-1)+Fd2)/2^n, \end{aligned}$$

wherein n is a positive integer.

Figure 8A:
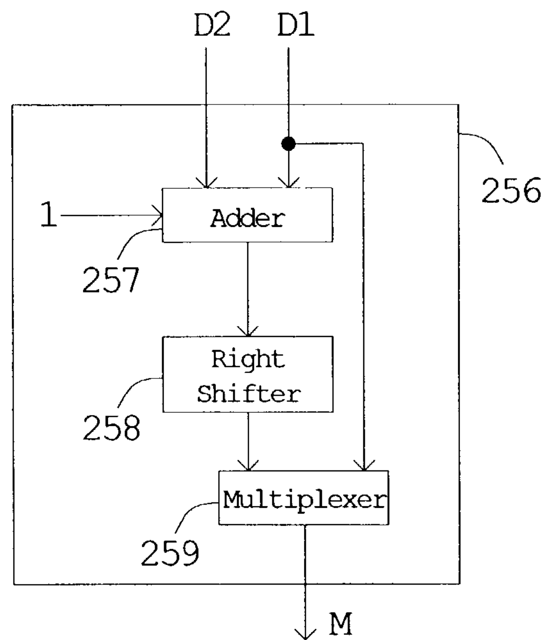
FIG. 8A illustrates the conventional block diagram of the Interpolator.

In order to support the calculation of equation (3), the functionality of the Interpolator in the Motion Compensator 410 has to be expanded. FIG. 8A illustrates the conventional block diagram of the Interpolator 256. The Interpolator 256 includes an Adder 257, a Right Shifter 258, and a Multiplexer 259. When the Motion Compensator 250 is performing forward motion compensation, the Multiplexer 259 outputs the motion-compensated block M directly according to the block D1. When the Motion Compensator 250 is performing bi-directional motion compensation, the Adder 257 receives the block D1 and the block D2, sums D1 and D2, adds 1 to the sum and outputs the final value as an add-signal. The Right Shifter 258 right-shifts the add-signal one bit to divide the add-signal by 2 to create the motion-compensated block M, and then the motion-compensated block M is output by the Multiplexer 259. The reason for adding 1 to the sum of D1 and D2 by the Adder is to obtain the rounding-to-the-nearest-integer interpolation value after the division by the Right Shifter 258. However, the traditional Interpolator 256 in Motion Compensator 250 only divides the sum of D1 and D2 by 2 and this is insufficient for the calculation of the dissolve effect required by equation (3).

Figure 8B:
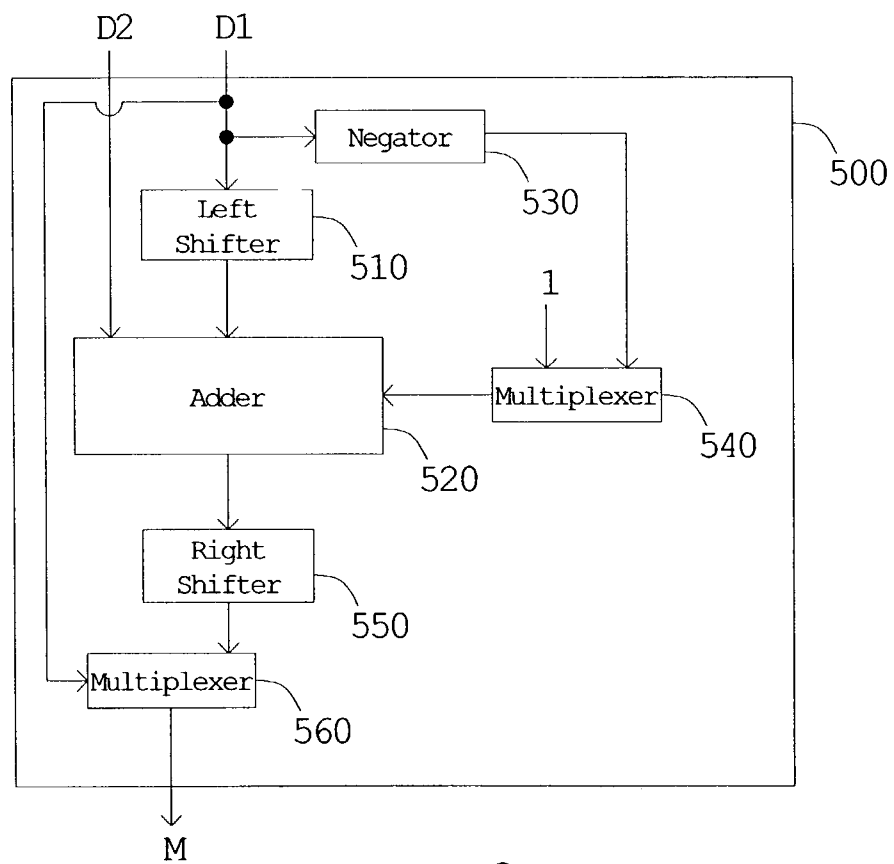
FIG. 8B illustrates the block diagram of the Interpolator of the embodiment.

FIG. 8B illustrates the block diagram of the Interpolator 500 of the preferred embodiment. The Interpolator 500 is used to achieve the functionality required by equation (3). The Interpolator 500 includes a Left Shifter 510, a Negator 530, a Multiplexers 540, 560, an Adder 520, and a Right Shifter 550. The Left Shifter 510 left-shifts the block D1 by n bits, where n is a positive integer, and outputs a left-shift-signal. The Negator 530 converts the data in block D1 from positive to negative values and outputs a negate-signal. The Multiplexer 540 chooses either the negate-signal or the constant-signal 1 according to the operation mode of the Motion Compensation, and outputs a multiplex-signal.

When the Motion Compensator 410 is in the operation mode of performing original bi-directional motion compensation for decoding MPEG bit-streams in the DVD video disks, the Left Shifter 510 left-shifts the block D1 by 0 bits and outputs a left-shift-signal; the multiplex-signal of the Multiplexer 540 is 1; the Right-Shifter 550 right-shifts the add-signal by 1 bit to create the motion-compensated block M.

When the Motion Compensator 410 creates a B-virtual picture for the dissolve effect, the multiplex-signal is the negate-signal. The Left-Shifter 510 left-shifts the block D1 n bits, and outputs a left-shift-signal. The Adder 520 receives the multiplex-signal, the left-shift-signal and the block D2, and then sums them all up and outputs the sum as an add-signal. The Right Shifter 550 right-shifts the add-signal by n bits and creates the motion-compensated block M, which is then output by the Multiplexer 560.

When the Motion Compensator 410 is in the operation mode of performing forward motion compensation, the Multiplexer 560 outputs the motion-compensated block M according to the block D1 directly.

During the dissolve effect created by equation (3), the alpha value can have a constant $\frac{1}{2}^n$ value during the entire Td. In another embodiment of the invention, Td can be divided into several stages and each stage has its own fixed alpha value in the form of $\frac{1}{2}^n$, for example, ½, ¼, or ⅛, wherein n is a positive integer. In another embodiment of the invention, each virtual picture in the Td period can be assigned independently with an alpha value of $\frac{1}{2}^n$ format. Hence, the speed and degree of the dissolve effect can be controlled more effectively.

Other transition effects besides the above dissolve, wipe and move-in transition effects can also easily be achieved by using the virtual picture function of the Motion Compensator in a similar way and are not described here for the sake of brevity.

Hence, the invention utilizes the Motion Compensator to achieve the transition effects between displaying pictures, the hardware cost is reduced and the system performance is enhanced.

While the present invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video decoding system having a first mode of decoding an encoded video data stream and generating decoded video data to a memory, and having a second mode of generating a virtual picture between a first picture and a second picture to the memory, the video decoding system comprising a Variable Length Decoder (VLD) module, an Inverse Quantization (IQ) module, an Inverse Discrete Cosine Transformer (IDCT) module, a Motion Compensator (MC) module, a Block Reconstruction (BR) module, and a parameter generating module, wherein in the first mode, the VLD module receives the encoded video data stream, performs variable length decoding on the encoded video data stream, and generates first parameters and second parameters;

the IQ and IDCT modules receive the second parameters, perform inverse quantization and inverse discrete cosine transformation on the second parameters, and generate third parameters;

the MC module receives the first parameters, performs motion compensation, and generates fourth parameters;

the BR module combines the third parameters and the fourth parameters, and generates the decoded video data to the memory, wherein in the second mode, the parameter generating module generates a virtual picture parameter to the MC module so as to make the BR module generate the virtual picture between the first picture and the second picture to the memory, wherein the virtual picture parameter is not generated by decoding the encoded video data stream.

2. The video decoding system of claim 1, wherein in the second mode the virtual picture parameter is generated according to a desired transition effect between the first picture and the second picture.

3. The video decoding system of claim 1, wherein in the second mode the MC module is capable of performing a forward motion compensation by retrieving the first picture, and capable of performing a bi-directional motion compensation by retrieving both the first picture and the second picture.

4. The video decoding system of claim 3, wherein when the MC module is performing the forward motion compensation, the virtual picture parameter comprises a motion type indicating a size of a block in the first picture to be retrieved by the MC module, and a motion vector indicating an address in the memory to be retrieved by the MC module.

5. The video decoding system of claim 4, wherein MC module further comprises:

an Address Generator that receives the motion vector and outputs a fetch-address accordingly;

a Data Buffer that retrieves the size of the block from the first picture according to the fetch-address; and an Interpolator that receives the block and outputs a motion-compensated block to the BR module.

6. The video decoding system of claim 3, wherein when the MC module is performing the bi-directional motion compensation, the virtual picture parameter comprises a motion type indicating a size of a block in the first picture and the second picture to be retrieved by the MC module, a forward motion vector indicating a first address in the memory to be retrieved by the MC module, and a backward motion vector indicating a second address in the memory to be retrieved by the MC module.

7. The video decoding system of claim 6, wherein the Motion MC module further comprises:

an Address Generator that receives the forward motion vector and the backward motion vector, and outputs a first fetch-address and a second fetch-address, respectively;

a Data Buffer that retrieves a first block from the first picture and a second block from the second picture according to the first fetch-address, the second fetch-address, and the motion type;

an Interpolator that receives the first block and the second block, interpolates the first block and the second block, and outputs a motion-compensated block to the BR module.

8. The video decoding system of claim 7, wherein the Interpolator further comprises:

a Left Shifter that left shifts the first block data by n bits, where n is a positive integer, and outputs a left-shift-signal;

a Negator that converts the left-shift-signal into a negative value, and outputs a negate-signal;

a first Multiplexer that receives the negate-signal, outputs a multiplex-signal, wherein the multiplex-signal is a constant signal when the video decoding system is in the first mode, or the negate-signal when the video decoding system is in the second mode;

an Adder that receives the second block, the left-shift signal, and the multiplex-signal, and generates an added signal;

a Right Shifter that right-shifts the added signal by n bits and outputs a right-shift-signal to the BR module.

9. The video decoding system of claim 1, wherein in the second mode the parameter generating module further generates a fifth parameter to make the BR module ignore the third parameters.

10. A video decoding system having a first mode of decoding an encoded video data stream and generating decoded video data to a memory, and having a second mode of generating a virtual picture corresponding to a first picture to the memory, the video decoding system comprising a Variable Length Decoder (VLD) module, an Inverse Quantization (IQ) module, an Inverse Discrete Cosine Transformer (IDCT) module, a Motion Compensator (MC) module, a Block Reconstruction (BR) module, and a parameter generating module, wherein in the first mode, the VLD module receives the encoded video data stream, performs variable length decoding on the encoded video data stream, and generates first parameters and second parameters;

the IQ and IDCT modules receive the second parameters, perform inverse quantization and inverse discrete cosine transformation on the second parameters, and generate third parameters;

the MC module receives the first parameters, performing motion compensation, and generates fourth parameters;

the BR module combines the third parameters and the fourth parameters, and generates the decoded video data to the memory, wherein in the second mode, the parameter generating module generates a virtual picture parameter to the MC module so as to make the BR module generate the virtual picture to the memory, wherein the virtual picture parameter is not generated by decoding the encoded video data stream.

11. The video decoding system of claim 10, wherein in the second mode the virtual picture parameter is generated according to a desired transition effect.

12. The video decoding system of claim 10, wherein in the second mode the MC module are capable of performing a forward motion compensation by retrieving the first picture.

13. The video decoding system of claim 12, wherein when the MC module is performing the forward motion compensation, the virtual picture parameter comprises a motion type indicating a size of a block in the first picture to be retrieved by the MC module, and a motion vector indicating an address in the memory to be retrieved by the MC module.

14. The video decoding system of claim 10, wherein the MC module further comprises:

an Address Generator that receives the motion vector and outputs a fetch-address accordingly;

a Data Buffer that retrieves the size of the block from the first picture according to the fetch-address; and an Interpolator that receives the block and outputs a motion-compensated block to the BR module.

15. The video decoding system of claim 10, wherein in the second mode the parameter generating module further generates a fifth parameter to make the BR module ignore the third parameters.

16. A method to generate at least one virtual picture corresponding to a first picture so as to achieve a desired transition effect of the first picture in a video decoding system capable of performing a decoding operation on an encoded video data stream, wherein the video decoding system comprises a Motion Compensator (MC) module for performing motion compensation during the decoding operation, the method comprising the steps of:

generating a virtual picture parameter to the MC module so as to make the MC module generate the virtual picture, wherein the virtual picture parameter is generated according to the first picture and the desired transition effect, and is not generated by decoding the encoded video data stream.

17. A method to generate at least one virtual picture between a first picture and a second picture so as to achieve a desired transition effect between the first picture and the second picture in a video decoding system, the video decoding system capable of decoding an encoded video data stream and performing a bi-directionally predictive decoding so as to generate a bi-directionally predictive decoded picture, the method comprising:

generating a virtual picture parameter, wherein the virtual picture parameter is generated according to the first picture and the desired transition effect, and is not generated by decoding the encoded video data stream; and performing the bi-directionally predictive decoding on the first picture and the second picture according to the virtual picture parameter so as to generate the virtual picture.

18. The method of claim 17, wherein the method further comprising gradually decreasing a first signal intensity of the first picture and gradually increasing a second signal intensity of the second picture.

19. The method of claim 18, wherein step of gradually decreasing the first signal intensity of the first picture and step of gradually increasing the second signal intensity of the second picture are implemented by multiplying the first signal intensity with a first value which gradually decreases during a period of time and multiplying the second signal intensity with a second value which gradually increases during the period of time, wherein a sum of the first value and the second value is kept constant during the period of time.

20. The method of claim 17, wherein the method further comprising modifying a first signal intensity of the first picture (Fd1) and a second signal intensity of the second picture (Fd2) so as to generate a third signal intensity of the virtual picture (Fd0(t)) according to the following equation:

$$Fd0(t)=Fd1, \text{ when } t=0;$$

$$Fd0(t)=(1-\text{alpha})*Fd0(t-1)+\text{alpha}*Fd2, \text{ when } t>0,$$

wherein t denotes a time taken to achieve the desired transition effect, and alpha is a constant ranging from 0 to 1.

21. The method of claim 20, wherein alpha is in a $½^n$ format, n is a positive integer.

* * * * *